(12) United States Patent
Bryden

(10) Patent No.: US 7,452,606 B2
(45) Date of Patent: Nov. 18, 2008

(54) SILICON CARBIDE CERAMIC COMPONENTS HAVING OXIDE LAYER

(75) Inventor: Raymond H. Bryden, Holden, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 416 days.

(21) Appl. No.: 10/836,829

(22) Filed: Apr. 30, 2004

(65) Prior Publication Data

US 2005/0008878 A1    Jan. 13, 2005

Related U.S. Application Data

(60) Provisional application No. 60/467,013, filed on May 1, 2003.

(51) Int. Cl.
*B32B 7/00* (2006.01)

(52) U.S. Cl. .................. 428/432; 428/304.4; 428/312.2; 428/312.6; 428/318.4; 428/319.1; 428/325; 428/428; 428/698; 428/701; 428/702

(58) Field of Classification Search ............... 428/428, 428/432, 698, 701, 702, 304.4, 312.2, 312.6, 428/318.4, 319.1, 325
See application file for complete search history.

(56) References Cited

U.S. PATENT DOCUMENTS

| | | | |
|---|---|---|---|
| 2,609,318 A * | 9/1952 | Swentzel | 428/450 |
| 3,394,028 A | 7/1968 | Parr et al. | |
| 3,811,928 A | 5/1974 | Henney et al. | |
| 4,140,645 A * | 2/1979 | Beall et al. | 501/4 |
| 4,499,147 A | 2/1985 | Enomoto et al. | |
| 4,567,103 A * | 1/1986 | Sara | 428/408 |
| 4,613,522 A | 9/1986 | Vasilos | |
| 4,664,946 A | 5/1987 | Enomoto et al. | |
| 4,839,316 A | 6/1989 | Tiegs | |
| 4,990,469 A | 2/1991 | Dussaulx et al. | |
| 6,143,239 A | 11/2000 | Sonntag | |
| 6,331,362 B1 * | 12/2001 | Dupel et al. | 428/689 |
| 6,347,446 B1 | 2/2002 | Luthra et al. | |
| 6,759,117 B2 * | 7/2004 | Bauer et al. | 428/698 |
| 2002/0136835 A1 | 9/2002 | Li et al. | |

FOREIGN PATENT DOCUMENTS

| | | |
|---|---|---|
| DE | 294 703 A | 10/1991 |
| EP | 0 393 332 A1 | 10/1990 |
| EP | 0 718 254 A2 | 6/1996 |

(Continued)

OTHER PUBLICATIONS

Xie et al "Formation of silicon nitride bonded silicon carbide by aqueous glecasting" Materials Science & Eng A349 (2003) 20 28.*

(Continued)

*Primary Examiner*—Archene Turner
(74) *Attorney, Agent, or Firm*—Larson Newman Abel Polansky & White, LLP; Robert T. Conway

(57) ABSTRACT

A ceramic component is provided, including a ceramic body containing silicon carbide, and an oxide layer provided on the ceramic body, the oxide layer being formed by oxidizing the ceramic body in the presence of alumina and boron.

19 Claims, 1 Drawing Sheet

FOREIGN PATENT DOCUMENTS

| | | | |
|---|---|---|---|
| EP | 1 264 807 A | | 12/2002 |
| JP | 56 103339 A | | 8/1981 |
| JP | 59 227787 A | | 12/1984 |
| JP | 62-030681 | * | 2/1987 |
| JP | 07 206556 A | | 8/1995 |
| SU | 1530623 | * | 12/1989 |
| SU | 1806119 | * | 3/1993 |

OTHER PUBLICATIONS

"*High Temperature Oxidation of Porous Non-Oxide Ceramics: Recent Advances in Modelling and Protection by Coatings,*" J. Desmaison, Laboratorie de Materiaux Ceramiques et Traitements de Surface, Corrosion of Advanced Ceramics, pp. 309-327, 1994.

"*Effect of Glass Sealing on the Oxidation Behavior of Three Dimensional C/SiC Compisties in Air,*" Laifei Cheng, et al., Elsevier Science Ltd., PII: S0008-6223(00)00148-2, pp. 1127-1133, 2001.

"*Glass Coating for SiC/SiC Composites for High-Temperature Application,*" M. Ferraris, et al., Acta Metallurgica, Inc., Elsevier Science Ltd., PII S1359-6454(00)00263-9, pp. 4721-4724, 2000.

"*Ceramic Coatings for Carbon-Carbon Composites,*" James. R. Strife, et al., United Technologies Research Center, Ceramic Bulletin, vol. 67, No. 2, pp. 369-374, 1988.

"*Effect of Alumina Particle Size on Prevention of Crystal Growth in Low-k Silica Dielectric Composite,*" Jau-Ho Jean, et al., Materials Chemistry and Physics 40, pp. 50-55, 1995.

"*Devitrification Inhibitor in Binary Borosilicate Glass Composite,*" Jau-Ho Jean, et al., Alcoa Electronic Packaging, Inc., J. Mater. Res., vol. 8, No. 2, pp. 356-363, 1993.

"*Devitrification Inhibitors In Borosilicate Glass and Binary Borosilicate Glass Composite*" Jau-Ho Jean, Department of Materials Science and Engineering, National Tsing Hua University, J. Mater. Res., vol. 10, No. 5, pp. 1312-1320, 1995.

"*Effects of Alumina Addition on Crystillization of Borosilicate Glass,*" Yoshihiki Imanaka, et al., Fujitsu Laboriatories, Ltd., J. Ceram. Soc. Jpn. Inter. Ed. vol. 97, pp. 301-305, 1989.

"*Silicon Carbide Sinters Having Erosion-Resistant Protective Layers*", Chemical Abstracts, vol. 102, No. 20, 1985, Columbus, OH.

Zhang, "The Production and use of the Si3N4-SiC Material", Shandong Ceramic. Mar. 1999, pp. 11-17.

* cited by examiner

SILICON CARBIDE CERAMIC COMPONENTS HAVING OXIDE LAYER

CROSS REFERENCE TO RELATED APPLICATIONS

This application claims priority to U.S. Provisional Application 60/467,013, filed May 1, 2003.

BACKGROUND

1. Field of the Invention

The present invention generally relates to ceramic components, and in particular, silicon carbide-based ceramic components that find particular use in refractory applications.

2. Description of the Related Art

As is well understood in the area of ceramic processing, ceramic bodies are typically heated or fired at relatively high temperatures, such as on the order of 1,000° C. and higher. Such firing operations require use of refractory materials and refractory components that are resistant to such high temperatures, and which maintain structural integrity not only at high temperatures, but upon repeated heating and cooling cycles during the service life of the furnace or kiln. Such refractory components include furnace or kiln furniture utilized in connection with holding or supporting work pieces during firing operations, as well as refractory lining materials and structural walls defining the furnace heating area.

Silicon carbide-based ceramic materials have been utilized in refractory applications for their various high temperature properties, including corrosion resistance, strength, thermal shock resistance, thermal conductivity, and other properties. Among various types of silicon carbide-based ceramics, dense silicon carbide ceramics such as sintered silicon carbide, hot pressed silicon carbide, and hot isostatically pressed silicon carbide have particularly robust characteristics. However, because of the production complexity and costs associated with fabrication of highly dense silicon carbide components (such as Hexoloy®), such components are not widely used as refractory components, and only used under the most severe service conditions. On the other hand, more cost effective but relatively porous silicon carbide materials such as nitride bonded silicon carbide (known by acronyms such as NBSC and NSIC) have found practical use in refractory applications.

Nitride bonded silicon carbide tends to be a comparatively porous material, oftentimes having a porosity within a range of about 10 to about 15 volume percent. These components are manufactured from a green body containing silicon carbide and silicon, and sintering the green body in a nitrogen containing atmosphere at temperatures on the order of 1,500° C. While nitride bonded silicon carbide has desirable high temperature properties, it unfortunately suffers from poor oxidation resistance when used in oxidizing conditions, due in part to its intrinsic porosity. This particular characteristic has been addressed in the past by re-firing nitride bonded silicon carbide components in an oxidizing atmosphere to form a thin oxide layer of amorphous or glassy silica, which functions to passivate and seal the outer surface of the component. However, the present inventor has recognized that the outer passivation layer formed by an oxidation process does not adequately protect the component from excessive oxidation during use, particularly in demanding firing operations, which can lead to premature component failure. Multiple mechanisms have been identified in connection with the unwanted oxidation.

Foremost, during use of such components, the outer passivation layer may be damaged, permitting a pathway for deep oxidation. Further, phase changes in the passivation layer may cause tensile stresses and subsequent initiation and propagation of cracks in the layer. In addition, the presence of water vapor may cause blistering or bubbles to form in the passivation layer, leading to failure of the passivation layer and undesirable oxidation of the component.

Other techniques have focused on forming an outer, protective layer by firing a glass former, such as a silica-containing coating or a silica precursor, that is coated on the component. However, unfortunately, such processing pathways tend to form porous layers that have a propensity to crack and spall during use, rendering the outer protective layer of limited effectiveness.

In view of the state of the art of silicon carbide-based refractory materials, and in particular, nitride bonded silicon carbide components, there is a need in the art for improved components, particularly components having improved oxidation resistance in practical use.

SUMMARY

According to one aspect of the present invention, a ceramic, component is provided, which includes a ceramic body and an oxide layer provided on the ceramic body. The ceramic body contains silicon carbide, and the oxide layer is formed by oxidizing the ceramic body in the presence of alumina and boron. The alumina may have a relatively fine (submicron) particle size.

According to another feature of the present invention, a ceramic component is provided including a ceramic body containing nitride bonded silicon carbide, and an oxide layer provided on the ceramic body. The oxide layer contains borosilicate glass which contains alumina.

According to yet another feature of the present invention, a method for forming a ceramic component is provided, which includes providing a ceramic body containing silicon carbide, coating the ceramic body with alumina and boron, and oxidizing the ceramic body. The alumina may have a relatively fine (submicron) particle size.

According to yet another feature of the present invention, a method for processing ceramic parts is provided. The method calls for providing ceramic parts and at least one refractory component in a furnace, and heat treating the ceramic parts and the at least one refractory component. The refractory component is formed of a ceramic body comprising silicon carbide, and an oxide layer on the ceramic body, the oxide layer containing borosilicate glass containing alumina. The method may be a comparatively low temperature process, in which the ceramic parts and refractory component are heated at a temperature not greater than 1300° C.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
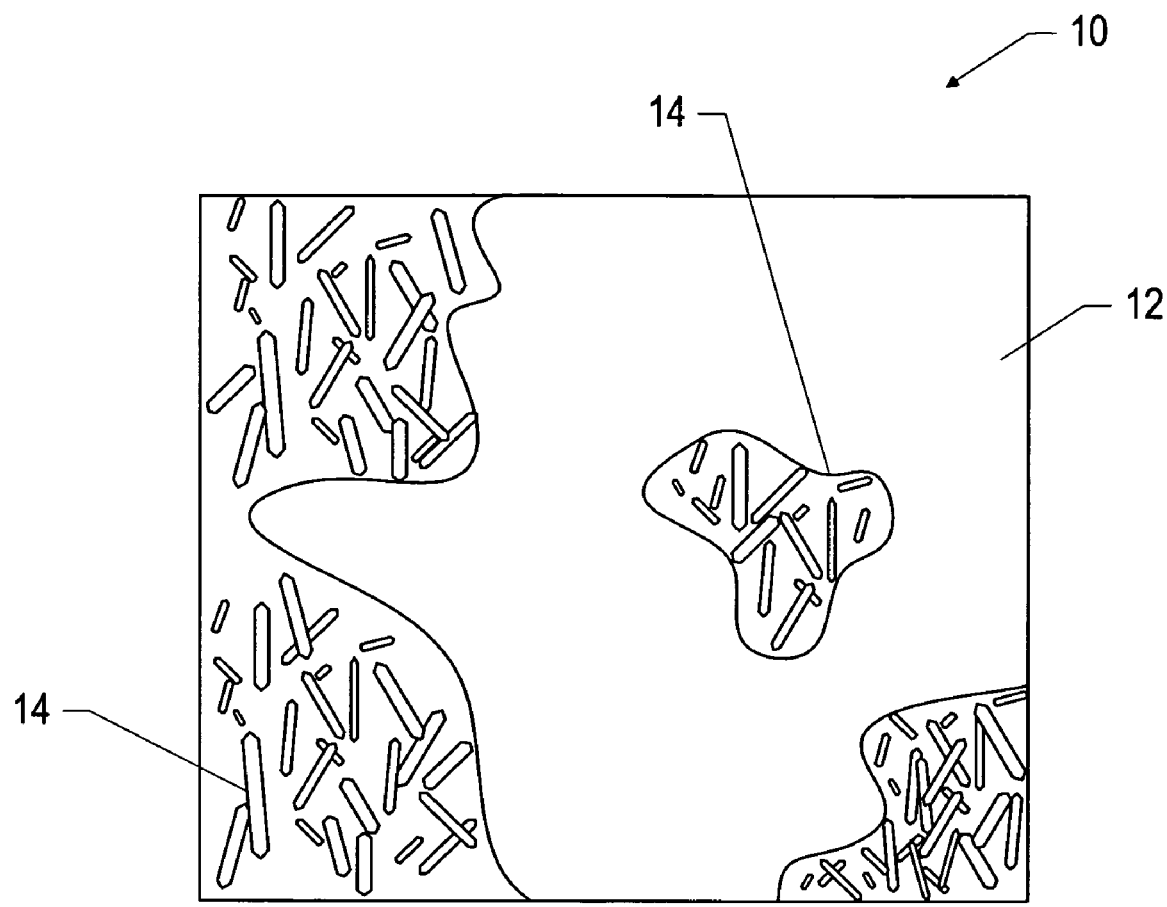
FIG. 1 illustrates fine crystals contained in the oxide layer according to an embodiment of the present invention.

According to an embodiment of the present invention, a ceramic component is provided which includes a ceramic body and an oxide layer provided on the ceramic body. The ceramic body generally contains silicon carbide, the silicon carbide generally forming the principle ceramic component of the ceramic body (greater than 50 wt %). According to the embodiment, the ceramic body is nitride-bonded silicon carbide, which, as described in the background, finds practical use in demanding refractory applications. In the case of nitride-bonded silicon carbide, the silicon nitride is present as a secondary component, and is generally provided within a range of about 5 to about 35 wt %, such as within a narrower range within about 22-29 wt %. The ceramic body also typically has a certain degree of porosity, typically within a range of about 5 vol % to about 25 vol %. Certain embodiments have porosities within a slightly narrower range, such as within a range of about 5 vol % to about 15 vol %, or even about 8 to 13 vol %.

Typically, the formation of the ceramic body begins with the formation of a slurry that is formed into a shaped body, such as by slip casting in a gypsum mold. For a detailed description of the techniques for forming the ceramic body, attention is drawn to U.S. Pat. No. 4,990,469, incorporated herein by reference. Generally speaking, a blend of fine and coarse silicon carbide powders is mixed together on a dry basis of about 40 wt % each. About 5 wt % alumina powder and about 0.5 wt % iron oxide powder are also added, with a balance of silicon powder, on the order of about 15 to 20 wt %. The foregoing weight percentages are upon a dry basis of the powder materials. While slip casting is generally used, other formation techniques used commonly in ceramic processing may also be used. For example, drip casting, pressing, pressure casting, extrusion, and other techniques.

The powder materials are then provided in an aqueous solution containing water, and suitable additives for dispersion and adjustment of pH. After preparation of a stable aqueous suspension or slurry, the suspension is poured into a plaster (gypsum) mold for casting. Water is drawn by capillary action through the gypsum mold, leaving behind a soft cast product. Following separation from the mold, the dried cast, a ceramic green body, is then heat treated in a nitrogen-containing atmosphere. Typically, the green body is heated to a temperature greater than about 1,200° C. for a time period of at least 12 hours. Particular embodiments may be heat treated in a nitrogen-containing atmosphere at higher temperatures and longer durations, such as on the order of 1,300° C., and at least 1 to 2 days. The firing of the ceramic body in the nitrogenous atmosphere is effective to react the silicon contained in the body with the nitrogen atmosphere, causing the formation of silicon nitride as a secondary phase, which bonds the primary silicon carbide phase.

The as-formed nitride bonded silicon carbide body is then generally subjected to an oxidation treatment. The oxidation treatment is generally carried out in the presence of alumina and, according to one embodiment, boron at the outer surface of the ceramic body. The boron is generally not in elemental form, and may be in solution such as boric acid or other boron-based precursors that form boron oxide ($B_2O_3$) during the oxidation treatment. Other precursors include boron nitride (BN), boron carbide (BC), boron-containing frits (glasses), and boron-containing minerals. While insoluble and soluble forms of boron oxide precursors may be used, such as boric acid and boron nitride, respectively, soluble forms of boron oxide precursor are advantageous for some applications. In this regard, soluble forms improve penetration or infiltration of the silicon carbide body, which may be beneficial to aid in healing deep cracks or other defects. The foregoing reference to boron above generally includes elemental boron and boron complexes and compounds, although typically it is desired that the boron-based component is a precursor of boron oxide ($B_2O_3$) upon carrying out the oxidation treatment.

The alumina typically has a fairly fine particle size such as less than about 1.0 microns, or less than about 0.8 microns. In certain embodiments, the particle size is less than about 0.5 microns, or even less than about 0.3 microns. The noted particle size is the average particle size of alumina powder which is present during the oxidation treatment. A particular embodiment has been formed based upon an alumina having a particle size of about 0.2 microns.

Particle size may take on particular significance according to certain embodiments, enabling the formation of desirable phases and morphology in the glassy protective layer, discussed in more detail below.

Typically, the boron component (generally a boron oxide precursor) and the alumina powder and/or an alumina precursor which forms fine alumina during oxidation, are coated on an outer surface of the ceramic body following nitridation. The boron component and the alumina or alumina precursor component may be coated simultaneously by incorporating both components in the same slurry, or separately, such as by separately coating an alumina slurry and a boric acid solution. Depending upon the particular geometric configuration of the ceramic body, the coating may be effected by spraying, dipping, brushing, and the like. Flat shapes may be coated with alumina by automatic, semi-automatic, or manual spraying operations using a standard spraying apparatus such as an air sprayer to achieve a thin, uniform coating on the surface. More complex shapes such as, posts and beams, may be dipped into a slurry containing fine alumina.

According to one embodiment, commercially available alumina slurry having a nominal 20% solids loading content of alumina in an aqueous solution is used for coating. This particular slurry, had a nominal pH of about 10.02, the pH typically being within a range of about 9 to about 11. The alumina coating slurry may be combined with the a boron-based solution, such as boric acid. The boric acid level may be about 2 to about 25 wt % in the total coating slurry (the alumina slurry combined with the boric acid solution). In one formulation, the foregoing alumina slurry is combined in a 50/50 ratio with a 10 wt % boric acid solution. In this case, the coating slurry contains 5 wt % boric acid.

Following the coating operation, the ceramic body is subjected to an oxidation treatment as generally noted above. Here, the oxidation may be carried out by refiring in an oxidizing atmosphere, such as ambient air, at a temperature greater than about 1,100° C., such as greater than about 1,200° C. Particular embodiments are fired at even higher temperatures, such as greater than about 1,300° C.

The resulting oxide layer formed following the oxidation process is silica-based, and includes at least one of alumina and an aluminosilicate. In this regard, the silica comprises a glassy or amorphous phase, although some amount of crystalline silica might be present, such as during practical use of the refractory component in furnacing operations. Silica is the primary and majority phase forming the matrix phase of the oxide layer, in which a crystalline aluminosilicate and/or alumina phase is present. A particular form of the aluminosilicate has been identified as mullite, having a composition of $3Al_2O_3 \cdot 2SiO_2$.

According to embodiments incorporating a boron component as discussed above, typically boron oxide ($B_2O_3$) is present as in the glassy silica phase, forming a borosilicate glass. While it is difficult to determine exact content of the boron oxide component due to generally available characterization techniques, typically the boron oxide is present in the glass in an amount greater than about 0.5 wt %, and typically less than about 25 wt %. More typically, the boron oxide is present within a range of about 0.5 wt % to about 10 wt % with respect to the total of the glass phase of the oxide layer. Certain embodiments may contain a limited amount of boron oxide, such as less than about 5.0 wt %.

According to a particular feature of an embodiment, the crystalline phase has been identified to contain anisotropically-shaped crystals comprised of at least one of alumina and an aluminosilicate. Indeed, certain embodiments have been found to have needle-shaped crystals, as generally depicted in FIG. 1. The crystalline phase may be mainly such needle-shaped crystals.

Turning to FIG. 1, an illustration from an SEM micrograph is provided, which depicts a ceramic component 10, forming a refractory component having an outer oxide layer containing an amorphous silica matrix phase 12, and a crystalline phase formed of needle-shaped alumina and/or aluminosilicate crystals 14. Typically, the crystals have an aspect ratio not less than about 3:1, typically not less than about 5:1. Indeed, certain embodiments had an aspect ratio that is relatively high, greater than about 10:1, indicating fairly elongated crystals. In this regard, aspect ratio is defined as the ratio of the longest dimension to the next longest dimension perpendicular to the length. While the foregoing has focused on the presence of needle-shaped crystals, other embodiments may have generally isometric crystals, which may result from use of relatively thick alumina coatings prior to oxidation and other factors.

Further, some of the crystals have a crystal size (along their longest dimension) greater than about 0.2 microns, but typically are relatively fine and have a crystal size less than about 30 microns, such as less than about 20 microns. The crystals may be within a narrower range, with a majority having an average crystal size within a range of about 0.5 to about 10 microns.

Turning to the composition of the glassy oxide layer, portions of the glass layer along amorphous regions (specifically excluding the crystalline regions) of various embodiments were examined. Generally, the layers contains about 10-50 wt % alumina, about 50-90 wt % silica, with a balance of secondary components such as iron oxide, sodium oxide, and potassium oxide. The alumina content may lie within a narrower range, on the order of about 12-50 wt %, or 15-25 wt %. One particular example was measured to have, by wt %, 75% $SiO_2$, 17.6% $Al_2O_3$, 5.4% $Na_2O$, 1.2% $K_2O$, 0.6% $Fe_2O_3$.

In embodiments containing boron, generally, the glassy layer contains about 10-50 wt % alumina, about 50-90 wt % silica, at least about 0.5 wt % boron oxide with a balance of secondary components such as iron oxide, sodium oxide, and potassium oxide. The alumina content may lie within a narrower range, on the order of about 12-50 wt %, or 15-25 wt %. The boron oxide content may also be within a narrower range, such as about 0.5-25 wt %; about 0.5-10 wt %; about 0.5-5.0 wt %; about 1.0-25 wt %; about 1.0-10 wt %; about 1.0-5.0 wt %; about 2.0-25 wt %; about 2.0-10 wt %; about 2.0-5.0 wt %; about 3.0-25 wt %; about 3.0-10 wt %; about 3.0-5.0 wt %; about 4.0-25 wt %; about 4.0-10 wt %; about 4.0-5.0 wt %; about 5.0-25 wt %; or about 5.0-10 wt %.

According to an embodiment of the present invention, the oxide layer forms a fairly uniform, conformal layer which covers substantially the entirety of the ceramic body. This oxide layer functions to passivate and protect the, underlying silicon carbide-based ceramic body from excessive oxidation. According to a particular feature, embodiments of the present invention have demonstrated significantly improved oxidation resistance in demanding furnacing applications, as compared to control samples formed in a similar manner, but without the addition of an alumina-based or alumina precursor coating prior to oxidation. In addition, such control samples were substantially free of anisotropic crystallites as described herein. While not wishing to be bound to any particular theory, it is believed that the presence of the fine crystallites composed of at least one of alumina and an aluminosilicate, contributes to improved performance as implemented in the furnacing applications to resist unwanted oxidation. Use of relatively fine alumina powder may be a contributing factor to the improved performance, and/or presence of fine crystallites.

A comparison of embodiments of the present invention to a control sample formed without introduction of fine alumina during the oxidation process, indeed demonstrated such superior oxidation resistance. In particular, the rate of weight gain during a steam oxidation test carried out at 900° C. was measured. The control sample demonstrated a rate of weight gain of $1.05 \times 10^{-4}$ wt % increase per hour, while an embodiment of the present invention (containing alumina but no boron) demonstrated a $0.7 \times 10^{-4}$ wt % increase per hour. This distinction represents a 33% improvement in oxidation resistance. Another embodiment (containing alumina and boron oxide) demonstrated a $0.05 \times 10^{-4}$ wt % increase per hour, representing even more significant improvement in oxidation resistance than the first embodiment.

Still further, comparative testing with alternate processing pathways that rely on use of a silica or silica precursor coated on the component, has also revealed the significance of utilizing an oxidation approach to form the protective layer. Namely, experience with coating nitride bonded silicon carbide components has shown a tendency to form porous layers that are not robust, and which spall and flake off during testing and/or use. In contrast, embodiments of the present invention that utilize oxidation-formed protective layers demonstrate superior performance, life, and reduced weight gain in oxidizing environments.

It is noted that control samples may contain alumina in the outer silica protective layer, originating from alumina present within the ceramic body itself. However, according to embodiments of the present invention, the outer protective layer is alumina-rich as compared to the control samples, as measured along glassy portions of the layer. To clarify, it was found that approximately 5 wt % of alumina in the ceramic body manifested into about 8 wt % in the outer silica protective layer according to the control samples. In contrast, according to the embodiments of the present invention, incorporation of a thin, fine alumina coating prior to oxidation provided a higher concentration of alumina in the protective layer, such as greater than about 10 wt %, greater than about 12 wt %, and certain embodiments greater than about 15%. Stated alternatively, according to embodiments of the present invention, the outer protective oxide layer contains greater than 5 wt % more alumina than in the ceramic body proper. More typically, the difference in concentrations of alumina between the ceramic body and the coating is generally greater than about 7 wt %, such as greater than about 10 wt %.

While the foregoing description has referred to refractory components in general, typically the refractory component is a structural component for use in firing, including sintering, ceramic bodies in a production environment. These supporting refractory components may take on form of kiln furniture, of one of several configurations including posts, which are intended for vertical orientation, beams, which may be connected to posts horizontally to form a supporting framework, sheets, which are typically planar and which are placed on top of beams for supporting ceramic bodies, and crucibles, which are firing containers that may be open or closed to the outer atmosphere during firing operations. In addition to kiln furniture, the refractory component may take on the form of a structural component of the furnace itself, such as a wall, or furnace lining, which may be composed of tiles. Use of the term "wall" is general, denoting vertical walls, as well as ceilings and floors defining a furnace environment.

In line with the foregoing, embodiments of the present invention relate to methods of utilizing refractory components such as kiln furniture, having properties as described herein. According to one embodiment, ceramic parts and at least one refractory component are provided in a furnace, and the ceramic parts are heat treated. The refractory component may have characteristics as described herein. For example, the refractory component typically has an oxide layer formed by oxidation of a ceramic body, in the presence of alumina having a submicron particle size. While heat treatment of the ceramic parts may be carried out over a fairly broad range and fairly broad hold times, embodiments of the present invention enable fairly low temperature firing (if desired), such as not greater than about 1,500° C. for a time period not less than about 1 hour. Certain processing operations may call for even lower temperatures, such as less than about 1,400° C., or not greater than 1300° C., and even longer duration times such as not less than about 4 hours, or even longer, such as not less than about 8 hours.

Further, heat treatments utilizing boron-component containing embodiments may be further limited. While heat treatment of the ceramic parts may be carried out over a fairly broad range and fairly broad hold times, such embodiments enable fairly low temperature firing, such as not greater than about 1,300° C. for a time period not less than about 1 hour. Certain processing operations may call for even lower temperatures, such as less than about 1,200° C., or not greater than 1100° C., and even longer duration times such as not less than about 4 hours, or even longer, such as not less than about 8 hours.

Use of state of the art refractory components in ceramic processing environments has oftentimes caused the components to stick together during high temperature processing, believed to be due to formation of an oxide during processing operations. According to embodiments of the present invention, the use of an oxide layer having properties as described herein, attenuates sticking. This may be due to the presence of fine crystallites as described above, or perhaps the reduction in oxide growth during use in ceramic processing, or a combination of such features.

While the invention has been illustrated and described as embodied in silicon carbide ceramic components having oxide layer, it is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A ceramic component, comprising:
a ceramic body comprising nitride bonded silicon carbide and an oxide layer, said oxide layer having an amorphous matrix comprising borosilicate glass and a crystalline phase in the amorphous matrix and comprising at least one of alumina or an aluminosilicate, the oxide layer forming an adherent, conformal layer that resists spalling and flaking and functions to passivate and protect the ceramic body from excessive oxidation and excessive weight gain.

2. A ceramic component comprising nitride bonded silicon carbide and an oxide layer, said oxide layer having an amorphous matrix comprising borosilicate glass and a crystalline phase in the amorphous matrix and comprising at least one of alumina anisotropically-shaped crystals or aluminosilicate anisotropically-shaped crystals.

3. The ceramic component of claim 2, wherein the ceramic body comprises silicon carbide as a primary component, and silicon nitride as a secondary component.

4. The ceramic component of claim 3, wherein the ceramic body comprises about 5 to about 35 wt % silicon nitride.

5. The ceramic component of claim 2, wherein the ceramic body has a porosity within a range of about 5 to about 25 vol %.

6. The ceramic component of claim 2, wherein the ceramic body is formed by reacting a green body with nitrogen while heating, the green body containing silicon carbide and silicon.

7. The ceramic component of claim 6, wherein the green body is formed by slip casting a slurry containing silicon carbide and silicon, forming a cast, and drying the cast.

8. The ceramic component of claim 2, wherein the ceramic component is a refractory component.

9. The ceramic component of claim 8, wherein the refractory component is selected from a group consisting of support posts, support beams, support plates, and containers.

10. The ceramic component of claim 2, wherein the crystalline phase includes said aluminosilicate, said aluminosilicate comprising mullite, said mullite having a composition $3Al_2O_3 \cdot 2SiO_2$.

11. The ceramic component of claim 2, wherein the borosilicate glass comprises alumina.

12. The ceramic component of claim 11, wherein the borosilicate glass comprises about 10-50 wt % $Al_2O_3$, about 50-90 wt % $SiO_2$, and about 0.5-10 wt % $B_2O_3$.

13. The ceramic component of claim 12, wherein the $B_2O_3$ is present within a range of about 0.5-5 wt %.

14. The ceramic component of claim 12, wherein the borosilicate glass further comprises at least one of $K_2O$, $Na_2O$, and $Fe_2O_3$.

15. The ceramic component of claim 2, wherein the anisotropically-shaped crystals have an aspect ratio not less than about 3:1.

16. The ceramic component of claim 2, wherein the oxide layer is a surface layer.

17. The ceramic component of claim 2, wherein the anisotropically-shaped crystals have a length not greater than 30 microns.

18. The ceramic component of claim 17, wherein the length is not greater than 20 microns.

19. The ceramic component of claim 18, wherein the length is not greater than 10 microns.

* * * * *

UNITED STATES PATENT AND TRADEMARK OFFICE
CERTIFICATE OF CORRECTION

| | | |
|---|---|---|
| PATENT NO. | : 7,452,606 B2 | Page 1 of 1 |
| APPLICATION NO. | : 10/836829 | |
| DATED | : November 18, 2008 | |
| INVENTOR(S) | : Raymond H. Bryden | |

It is certified that error appears in the above-identified patent and that said Letters Patent is hereby corrected as shown below:

On the Title page, item (56), delete "3,394,028" and insert --3,394,026--

In the Specification

Col. 2, line 27, delete "ceramic, component" and insert --ceramic component--

Col. 5, line 67, delete "the, underlying" and insert --the underlying--

Signed and Sealed this
Twenty-sixth Day of November, 2013

Margaret A. Focarino
*Commissioner for Patents of the United States Patent and Trademark Office*